(12) United States Patent  (10) Patent No.: US 8,521,931 B2
Sinykin et al.  (45) Date of Patent: Aug. 27, 2013

(54) SERIAL INPUT OUTPUT (SIO) PORT EXPANSION APPARATUS AND METHOD

(75) Inventors: Joshua P. Sinykin, Shrewsbury, MA (US); William K. Petty, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 344 days.

(21) Appl. No.: 12/981,847

(22) Filed: Dec. 30, 2010

(65) Prior Publication Data

US 2012/0173783 A1  Jul. 5, 2012

(51) Int. Cl.
*G06F 13/00* (2006.01)
*G06F 13/12* (2006.01)

(52) U.S. Cl.
USPC ........... 710/110; 710/71; 710/74; 710/300

(58) Field of Classification Search
USPC ............................. 710/71, 74, 110, 300
See application file for complete search history.

(56) References Cited

U.S. PATENT DOCUMENTS

| 7,000,037 B2* | 2/2006 | Rabinovitz et al. ........... 710/71 |
| 7,290,066 B2* | 10/2007 | Voorhees et al. .............. 710/5 |
| 7,450,027 B1* | 11/2008 | Overby ...................... 340/815.4 |
| 7,526,587 B2* | 4/2009 | Nemazie et al. ............ 710/74 |
| 8,078,770 B1* | 12/2011 | Sivertsen .................... 710/19 |
| 8,301,809 B2* | 10/2012 | Liu et al. .................. 710/74 |
| 8,301,810 B2* | 10/2012 | Pang et al. ................ 710/74 |
| 2007/0121496 A1* | 5/2007 | Sinykin et al. ............ 370/229 |
| 2009/0089473 A1* | 4/2009 | He .......................... 710/300 |
| 2012/0185626 A1* | 7/2012 | Stuhlsatz et al. .......... 710/105 |

OTHER PUBLICATIONS

LSI—"Product Brief—LSISASx28—28-Port 3Gb/s SAS Expander"; 2 pages, Dated 2009.*
American Megatrends—"MegaRAC MG9072—SAS/SATA Enclosure Management Controller"; 2 pages, Dated 2008.*
SFF Committee—"SFF8484 Specification for Serial GPIO (SGPIO) Bus—Revision 0.7"; 39 pages, Dated Feb. 1, 2006.*

* cited by examiner

*Primary Examiner* — Brian Misiura

(57) ABSTRACT

An expander device and method for transmitting serial input/output (SIO) data between an initiator device and a plurality of target devices. The expander device includes a processor/controller configured to receive a master data stream from an initiator device and to transmit a returning master data stream to the initiator device. The expander device includes a plurality of target master ports coupled to the processor/controller and configured to transmit split data streams to corresponding target devices coupled thereto and to receive returning split data streams from the target devices. The processor/controller splits the master data stream, based on its data, into a plurality of split data streams, and directs the split data streams to the target master ports based on the data in the split data streams. The processor/controller also assembles a plurality of returning split data streams into the returning master data stream and transmits the returning master data stream to the initiator device.

20 Claims, 6 Drawing Sheets

SERIAL INPUT OUTPUT (SIO) PORT EXPANSION APPARATUS AND METHOD

BACKGROUND OF THE INVENTION

1. Field of the Invention

The invention relates to Serial input/output (SIO) data stream devices and methods. More particularly, the invention relates to devices and methods that allow SIO data streams to be delivered by a single SIO initiator device to multiple SIO target devices.

2. Description of the Related Art

Serial input/output (SIO) refers to a method of communicating data between devices in which the individual data bits are sent sequentially from an initiator device to a target device. Serial General Purpose Input Output (SGPIO) refers to serializing general purpose IO signals, e.g., by defining the communication between the initiator device, such as a host bus adapter (HBA), and the target device, such as a hard drive slot backplane or other backplane holding hard disk drives (HDDs). The data bus as specified by SGPIO typically is a four-signal (or four-wire) bus between the host bus adapter and the backplane. Of the four signals, three are driven by the host bus adapter and one is driven by the backplane. Typically, the host bus adapter is a storage controller located inside a server, desktop, rack or workstation computer. The host bus adapter interfaces with the hard disk drives to store and retrieve data.

The SGPIO specification is maintained by the SFF (Small Form Factor) Committee, and its official name of the SGPIO specification is SFF-8485. Within the SGPIO specification, the International Blinking Pattern Interpretation (IBPI) defines how SGPIO data streams are interpreted into states and how light emitting diodes (LEDs) on a backplane interpret these states as status indicators.

In conventional SIO communication system arrangements, a single initiator device typically is coupled to a single target device via an SGPIO bus or other appropriate bus coupled therebetween. Therefore, as the number of target devices within an SIO system increases, the number of initiator devices must increase accordingly. Such an increase in the number of initiator devices increases overall system complexity and costs, while also reducing overall system efficiency.

In data transmission environments that do not use SIO data streams, a port expander storage device, such as a Serial Attached SCSI (SAS) expander, can be used to couple a single initiator device to a plurality of target devices. SCSI refers to the Small Computer Systems Interface set of electronic interface standards that allow various devices to communicate with one another, e.g., computers to communicate with peripheral devices. However, like conventional SIO communication system arrangements, data transmission between a SAS initiator device and a plurality of SAS target devices still is based on a one-to-one relationship between the initiator device and the target devices. That is, the SAS expander receives and stores a data transmission from the SAS initiator device and then routes or directs the stored data to only one of the plurality of SAS target devices at any given time. Thus, although the SAS expander allows a SAS initiator device to be coupled to and communicate with a plurality of SAS target devices, the data transmitted from the SAS initiator device and stored in the SAS expander can be delivered only to one SAS target device at any given time.

SUMMARY OF THE INVENTION

The invention is embodied in an expander device and method for transmitting serial input/output (SIO) data between an initiator device and a plurality of target devices. The expander device includes a processor/controller that is configured to receive a master data stream from an initiator device and to transmit a returning master data stream to the initiator device. The expander device also includes a plurality of target master ports that are coupled to the processor/controller and each configured to transmit a split data stream to a target device coupled thereto and to receive a returning split data stream from the target device coupled thereto. The processor/controller is configured to split the master data stream into a plurality of split data streams and to transmit the split data streams to the plurality of target master ports based on the split data streams. The processor/controller also is configured to assemble a plurality of returning split data streams into the returning master data stream and to transmit the returning master data stream to the initiator device. More specifically, the processor/controller splits the master data stream into a first split data stream having a first set of data bits, a second split data stream having a second set of data bits, a third split data stream having a third set of data bits and an nth split data stream having an nth set of data bits. The processor/controller transmits the first split data stream to a first target master port, the second split data stream to a second target master port, the third split data stream to a third target master port and the nth split data stream to an nth target master port. The processor/controller also receives a first returning split data stream from the first target master port, a second returning split data stream from the second target master port, a third returning split data stream from the third target master port and an nth returning split data stream from the nth target master port. The processor/controller also assembles the returning master stream from the returning split data streams in such a way that the data bits from the first returning split data stream are located in a first bit position in the returning master stream, the data bits from the second returning split data stream are located in a second bit position in the returning master stream, the data bits from the third returning split data stream are located in a third bit position in the returning master stream and the data bits from the nth returning split data stream are located in an nth bit position in the returning master stream.

DETAILED DESCRIPTION OF EXEMPLARY EMBODIMENTS

Figure 1:
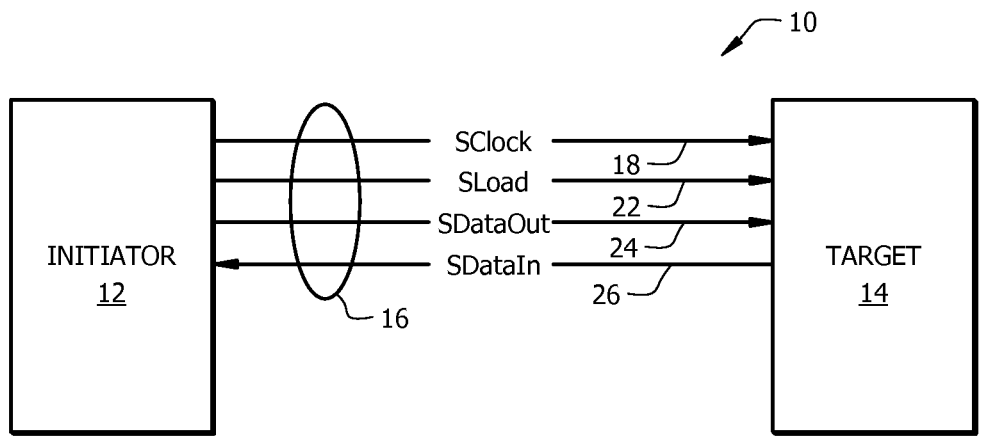
FIG. 1 is a schematic view of a conventional SGPIO bus arrangement between an initiator device and a target device.

In the following description, like reference numerals indicate like components to enhance the understanding of the invention through the description of the drawings. Also, although specific features, configurations and arrangements are discussed hereinbelow, it should be understood that such is done for illustrative purposes only. A person skilled in the relevant art will recognize that other steps, configurations and arrangements are useful without departing from the spirit and scope of the invention.

As used in this description, the terms "component," "module," and "system," are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes, such as in accordance with a signal having one or more data packets, e.g., data from one component interacting with another component in a local system, distributed system, and/or across a network, such as the Internet, with other systems by way of the signal.

Referring now to FIG. 1, shown is a schematic view of a conventional SGPIO (Serial General Purpose Input Output) bus arrangement 10 between an initiator device 12 and a target device 14. As discussed hereinabove, the initiator device 12 can be a host bus adapter (HBA) or other appropriate initiator device. The target device 14 can be a backplane holding hard disk drives (HDDs) or other appropriate target device.

An SGPIO bus or data bus 16 is coupled between the initiator device 12 and the target device 14. According to the SGPIO (SFF-8485) specification, the SGPIO bus 16 is a four-signal (or four-wire) bus, with three signals driven by the initiator device 12 and one signal driven by the target device 14. The SGPIO bus 16 includes an SClock signal or signal line 18, an SLoad signal or signal line 22, an SDataOut signal or signal line 24 and an SDataIn signal or signal line 26. The SClock signal 18 is the clock signal, and is driven by the initiator device 12. The SLoad signal 22, which also is driven by the initiator device 12, is the last clock of a data bit stream. Therefore, a new data bit stream is begun on the next clock signal after an SLoad signal (L). The SDataOut signal 24, which is driven by the initiator device 12, is the serial data output stream from the initiator device 12 to the target device 14. The SDataIn signal 26, which is driven by the target device 14, is the serial data input stream from the target device 14 to the initiator device 12.

Figure 2:
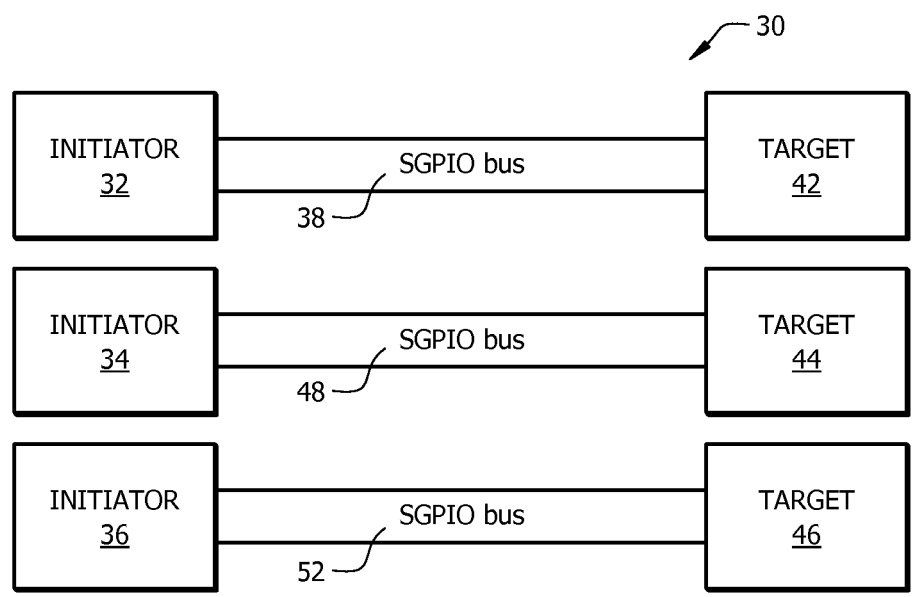
FIG. 2 is a schematic view of a conventional SGPIO bus arrangement between a plurality of initiator devices and a corresponding plurality of target devices.

Referring now to FIG. 2, shown is a schematic view of a conventional SGPIO bus arrangement 30 between a plurality of initiator devices 32, 34, 36 and a corresponding plurality of target devices 42, 44, 46. As discussed hereinabove, according to conventional SFF-8485 system arrangements, each target device has a one-to-one relationship with a corresponding initiator device. Therefore, each initiator device has a single, dedicated SGPIO bus coupled between the initiator device and a corresponding target device. Thus, in the SGPIO bus arrangement 30, the first initiator device 32 and the first target device 42 have a first SGPIO bus 38 coupled therebetween. Similarly, the second initiator device 34 and the second target device 44 have a second SGPIO bus 48 coupled therebetween, and the third initiator device 36 and the third target device 46 have a third SGPIO bus 52 coupled therebetween.

As can be seen, for an SFF-8485 system arrangement that has a relatively large number of target devices, the system also must have an equal number of initiator devices to maintain the one-to-one data bus relationship between an initiator device and a corresponding target device. For an SFF-8485 system arrangement having a relatively large number of target devices, such a relatively large number of corresponding initiator devices can be costly, complex and relatively inefficient due in part to the relatively large number of corresponding initiator device that also must exist in the system arrangement.

Figure 3:
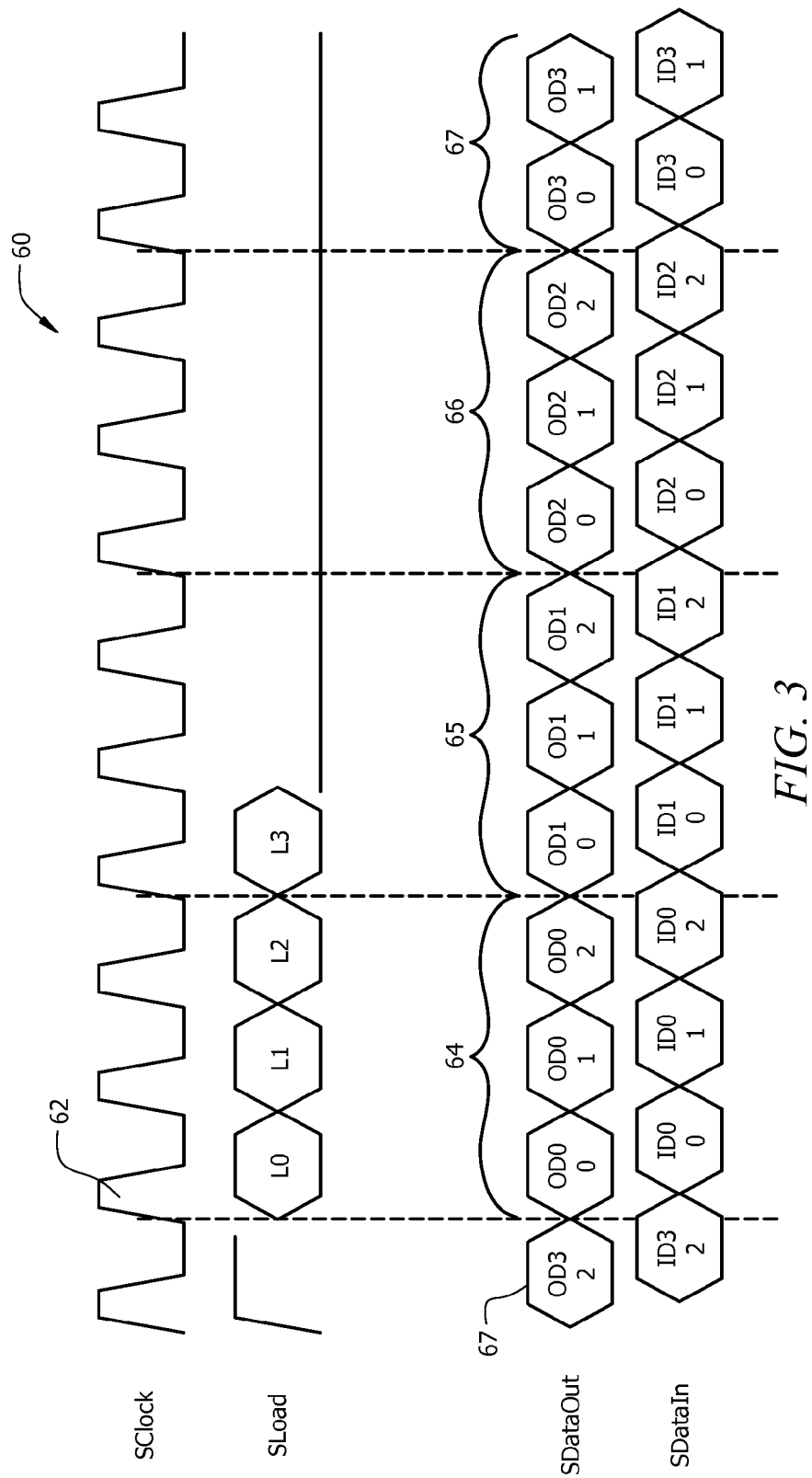
FIG. 3 is a schematic view of an SGPIO data bit stream.

Referring now to FIG. 3, shown is a schematic view of a typical SGPIO data stream 60 transmitted from an initiator device. As discussed hereinabove, the data stream 60 has four data signal lines: the SClock, the SLoad, the SDataOut, and the SDataIn. FIG. 3 shows the relationship between the data on the SClock signal line, the SLoad signal line and the two data bit signal lines (SDataOut and SDataIn). An SGPIO frame typically is started after SLoad has been low for at least 5 SClock cycles.

Following the start of a new SGPIO frame, three (3) bits per drive (i.e., per target device) are driven from the initiator device onto the SDataOut signal line. Simultaneously, the target device drives three bits on the SDataIn signal line. The initiator and target devices both use the rising edge of the clock pulse to transmit changes in the SLoad, SDataOut and SDataIn signal lines. Thus, in the example data stream shown, upon the rising edge of a clock pulse 62, the initiator device drives on the SDataOut signal line three bits 64 (0, 1, 2) for a first target device (OD0), followed by three bits 65 (0, 1, 2) for a second target device (OD1), followed by three bits 66 (0, 1, 2) for a third target device (OD2), followed by three bits 67 (0, 1, 2) for a fourth target device (OD3). Of the three bits per drive, the first bit is used exclusively to represent Activity (A), the second bit is used to represent a Locate (L) of the drive and the third bit is used to represent the Fail state (F) of the located drive. As shown generally, the data on the SDataOut and SDataIn signal lines is continuous and repetitive.

The SGPIO data stream 60 shown in FIG. 3 is shown for four drive slots (12 clocks), i.e., for four target devices, which often is the minimum number of drive slots allowed. However, it should be understood that the SGPIO data stream can be used for any suitable number of drive slots and corresponding target devices, e.g., 4, 8, 12, 16 or 24 drives/slots, such as in the case of an expander or according to embodiments of the invention, as will be discussed in greater detail hereinbelow.

Figure 4:
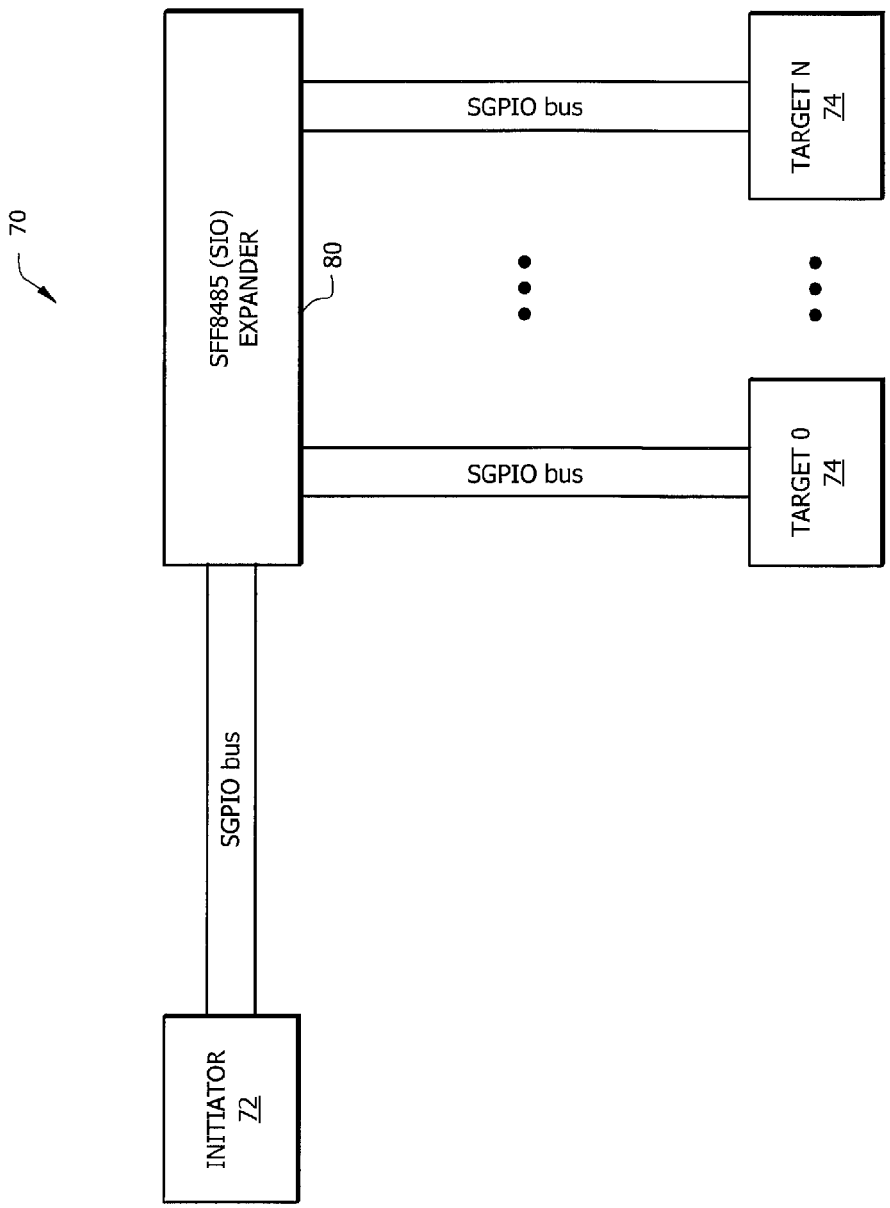
FIG. 4 is a schematic view of an SGPIO bus arrangement between an initiator device and a plurality of target devices, according to embodiments of the invention.

Referring now to FIG. 4, shown is a schematic view of an SGPIO bus arrangement 70 between an initiator device 72 and a plurality of target devices (shown generally as target devices 74), according to embodiments of the invention. According to embodiments of the invention, a serial input/output (SIO) or SFF-8485 expander device 80 is coupled between the initiator device 72 and the plurality of target devices 74. The expander device 80 can be configured to be coupled to any suitable number of target devices 74, e.g., 4, 8, 12, 16 or more target devices 74.

As will be discussed in greater detail hereinbelow, the expander device 80 is configured to receive an SGPIO compatible data stream and split the received stream into multiple, shorter SGPIO compatible streams, depending on the number of target devices coupled to the expander device 80. The expander device 80 also is configured to direct the multiple, shorter SGPIO compatible streams to the appropriate target devices. The expander device 80 also is configured to receive returning SGPIO compatible streams from the plurality of target devices and properly assemble the returning SGPIO compatible streams in proper bit order into a single SGPIO compatible stream for transmission to the initiator device 72. In this manner, the expander device 80 allows for a single initiator device to transmit an SGPIO data stream to a plurality of target devices without requiring the one-to-one SGPIO bus relationship between an initiator device and a target device, as in conventional system configurations. In this manner, the expander device 80 allows for scalable system growth without corresponding increased complexity or cost, thus improving overall system efficiency.

Figure 5:
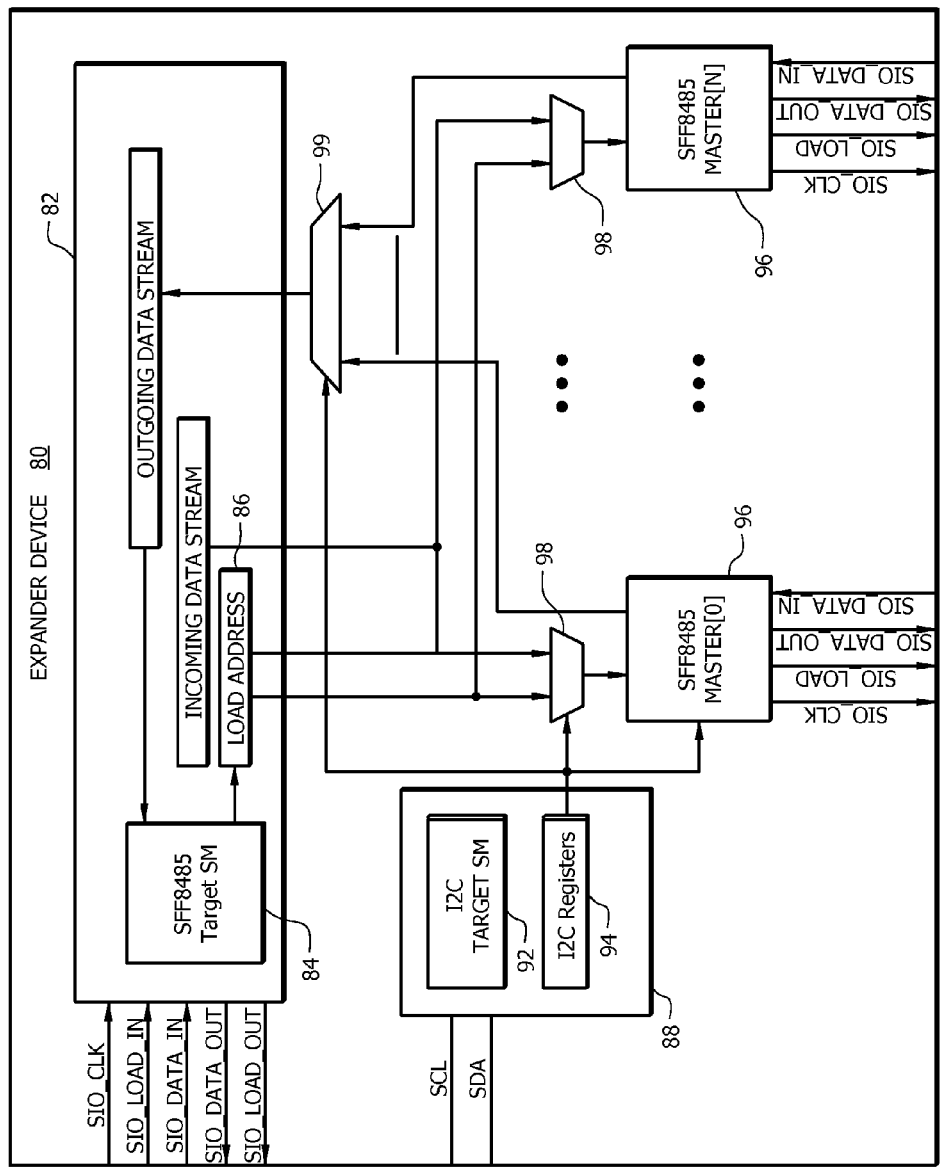
FIG. 5 is a schematic view of an apparatus for transmitting SGPIO data between an initiator device and a plurality of target devices, according to embodiments of the invention.

Referring now to FIG. 5, shown is a schematic view the expander device 80 for transmitting SGPIO data between a single initiator device and a plurality of target devices, according to embodiments of the invention. The expander device 80 includes a processor/controller 82 having a state machine (e.g., an SFF-8485 target state machine) 84 and a load address register 86, as well as other associated data registers (not shown). The processor/controller 82 and/or the state machine 84 are configured to manage or process the operation of the expander device 80, including receiving a master data stream from an initiator device and transmitting multiple split data streams to appropriate target devices, as well as receiving multiple split data streams from the plurality of target devices and transmitting an assembled master data stream to the initiator device.

It should be understood that the processor/controller 82 can include any suitable conventional elements, such as microprocessors, memory and hard-wired logic, that in accordance with suitable programming or configuration logic allow the processor/controller 82 to effect the functions or methods described herein, as well as any other suitable functions that persons skilled in the art understand are characteristic of conventional storage controllers. Such programming logic can be stored in the form of software or firmware that has been loaded into memory for execution by one or more processors, either on an as-needed or random-access basis or as firmware stored in non-volatile memory (e.g., programmable read-only memory).

The expander device 80 also includes an I2C (Inter IC) bridge or target bridge 88, which typically includes an I2C target state machine 92 and one or more I2C registers 94. The expander device 80 also includes a plurality of target master ports (e.g., SFF-8485 master ports) 96 that are coupled to the processor/controller 82 via a corresponding plurality of multiplexers (MUXs) or other suitable coupling devices 98 for multiplexing data to the respective target master port 96. The expander device 80 also includes at least one other multiplexer or other suitable coupling device 99 that is coupled between the target master ports 96 and the processor/controller 82 for multiplexing data to the processor/controller 82. As will be discussed in greater detail hereinbelow, the target master ports 96 are configured to receive split data streams for transmission to the corresponding target devices (not shown), which are coupled to the outputs of the respective target master ports. The target bridge 88, which is coupled to each of the target master ports 96 and their corresponding coupling device 98, adds any appropriate configuration changes to the data in the split data streams being delivered to the respective target master ports 96.

One or more of the components within the expander device 80, including the processor/controller 82, the state machine 84, the load address register 86, the target bridge 88, the I2C target state machine 92, the one or more I2C registers 94, the master ports 96, and the coupling devices 98, 99, can be comprised partially or completely of any suitable structure or arrangement, e.g., one or more integrated circuits. Also, it should be understood that the expander device 80 includes other components, hardware and software (not shown) that are used for the operation of other features and functions of the expander device 80 not specifically described herein.

The expander device 80 can be partially or completely configured in the form of hardware circuitry and/or other hardware components within a larger device or group of components. Alternatively, the expander device 80 can be partially or completely configured in the form of software, e.g., as processing instructions and/or one or more sets of logic or computer code. In such configuration, the logic or processing instructions typically are stored in a data storage device (not shown). The data storage device typically is coupled to a processor, such as the processor/controller 82. The processor accesses the necessary instructions from the data storage device and executes the instructions or transfers the instructions to an appropriate location within the expander device 80.

In operation, the expander device 80 receives data (e.g., a master data stream) from an initiator device (not shown) via an SGPIO bus (not shown) coupled between the initiator device and the expander device 80. As discussed hereinabove, the SGPIO bus has an SClock signal line, an SLoad signal line, an SDataOut signal line and an SDataIn signal line. Correspondingly, the processor/controller 82 has an SIO_CLK input for coupling to the SClock signal line of the SGPIO bus, an SIO_LOAD_IN input for coupling to the SLoad signal line of the SGPIO bus, an SIO_DATA_IN input for coupling to the SDataOut signal line of the SGPIO bus, and an SIO_DATA_OUT output for coupling to the SDataIn signal line of the SGPIO bus. Also, the processor/controller 82 can include an SIO_LOAD_OUT output, which allows the expander device 80 to control the start of a "frame" according to the SFF-8485 protocol As discussed hereinabove, the initiator device drives data bits as part of a master data stream onto the SDataOut signal line, at the first clock signal (on SClock signal line) after the last clock of a previous bit stream (on SLoad signal line). The sequence of data bits in the master data stream received by the expander device 80 (via the SIO_DATA_IN input) includes a first set of bits (e.g., bits 64) for a first target device, followed by a second set of bits (e.g., bits 65) for a second target device, followed by a third set of bits (e.g., bits 66) for a third target device, and followed by an nth set of bits (e.g., bits 67) for an nth target device. In accordance with the SFF-8485 protocol, each set of data bits includes an Activity (A) bit, followed by a Locate (L) bit, followed by a Fail state (F) bit. However, it should be understood that the master data stream can be configured according to any suitable data stream protocol compatible with the expander device 80.

According to embodiments of the invention, the state machine 84 and/or other appropriate portions of the processor/controller 82 are configured to split the master data stream into a plurality of split data streams, based on the sets of data bits in the master data stream. For example, the state machine 84 and/or other appropriate portions of the processor/controller 82 are configured to split the master data stream into a first split data stream including the first set of data bits, a second split data stream including the second set of data bits, a third split data stream including the third set of data bits and an nth split data stream including the nth set of data bits.

According to embodiments of the invention, the state machine 84 and/or other appropriate portions of the processor/controller 82 also are configured to direct each split data streams to the appropriate target master port 96. That is, the state machine 84 and/or other appropriate portions of the processor/controller 82 are configured to direct the first split data stream to the coupling device 98 coupled to the first target master port 96, the second split data stream to the coupling device 98 coupled to the second target master port 96, the third split data stream to the coupling device 98 coupled to the third target master port 96, and the nth split data stream to the coupling device 98 coupled to the nth target master port 96.

The load address register 86, which is coupled to each of the coupling devices 98, provides appropriate data storage and movement instructions to the data in each of the split data streams via the corresponding coupling device 98 associated with the corresponding target master port 96. For example, the load address register 86 holds the data value that the initiator just shipped in to the expander device 80.

Therefore, according to embodiments of the invention, the coupling device 98 for each target master port 96 receives and couples the appropriate split data stream for the corresponding target master port 96, and the appropriate data storage and movement instructions from the load address register 86 for the appropriate split data stream and corresponding target master port 96. The coupling device 98 for each target master port 96 also receives any appropriate configuration changes, via the target bridge 88, to the data coupled for delivery to the corresponding target master ports 96.

Also, according to embodiments of the invention, in addition to directing the split data streams to the appropriate target master port 96, the state machine 84 and/or other appropriate portions of the processor/controller 82 also are configured to split the master data stream into a plurality of split data streams in a manner that does not adversely affect the timing of the sets of data bits being delivered to the target master ports 96, which in turn aids in maintaining the timing of the delivery of the sets of data bits from the target master ports 96 to their respective target devices. That is, the set of data bits in each split data stream maintains its bit position within the split data stream relative to an initial clock pulse as the set of data bits were positioned in the master data stream relative to the initial clock pulse.

Figure 6:
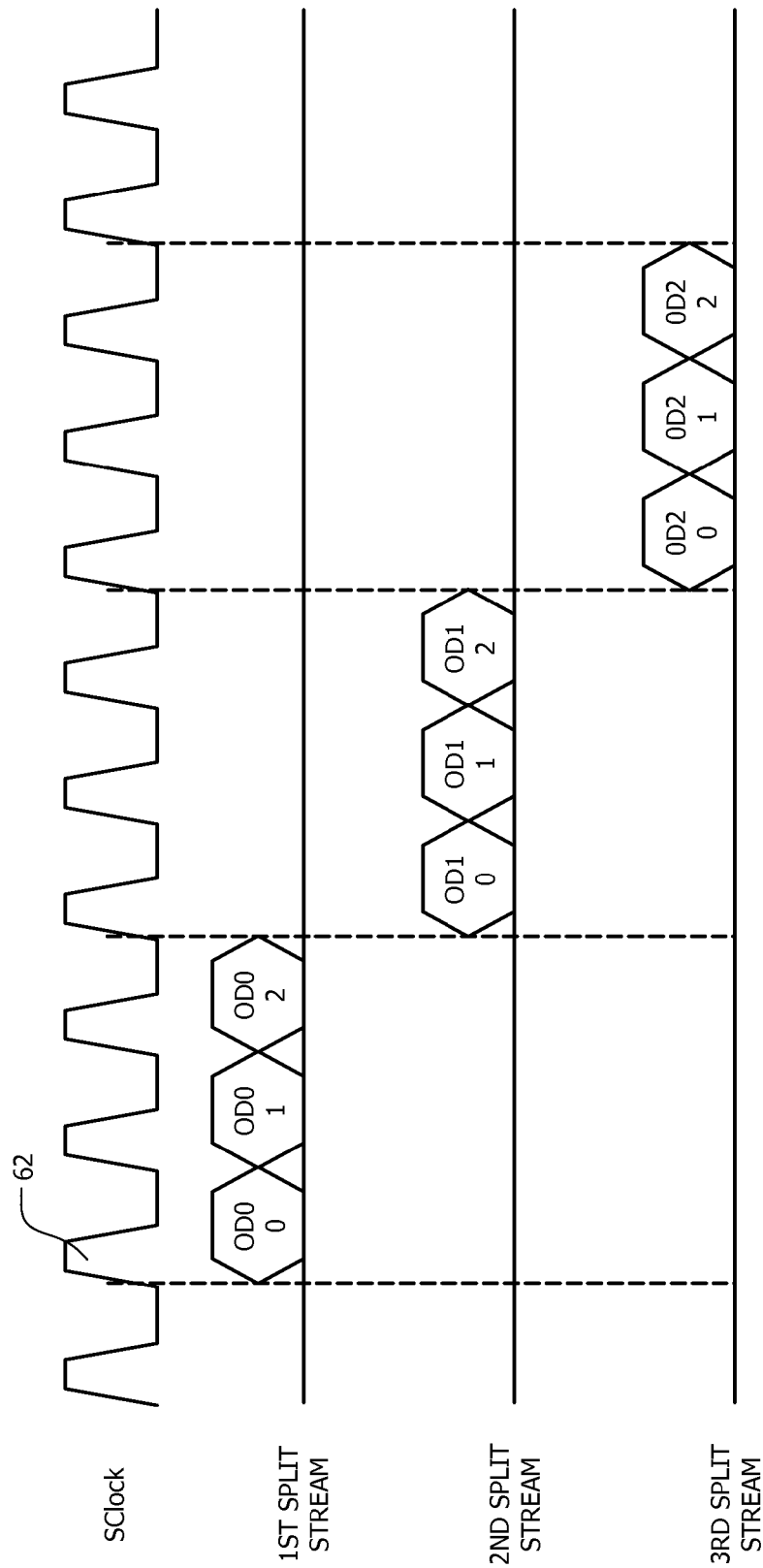
FIG. 6 is a schematic view of various split data bit streams, according to embodiments of the invention.

For example, referring now to FIG. 6, with continuing reference to FIG. 5, shown is a schematic view of various split data bit streams according to embodiments of the invention. As shown, in the first split data stream, the first set of data bits 64 is positioned in the same location (bit positions 1-3) relative to the initial clock pulse 62 as in the master data stream (see the position of the data bits 64 on the SDataOut signal line in FIG. 3). Similarly, in the second split data stream, the second set of data bits 65 is positioned in the same location (bit positions 4-6) relative to the initial clock pulse 62 as in the master data stream (see the position of the data bits 65 on the SDataOut signal line in FIG. 3) and, in the third split data stream, the third set of data bits 66 is positioned in the same location (bit positions 7-9) relative to the initial clock pulse 62 as in the master data stream (see the position of the data bits 66 on the SDataOut signal line in FIG. 3). According to embodiments of the invention, such data bit sets positioning occurs in other split data streams (not shown) as well. Therefore, each set of data bits occupies the same location in its respective split data stream as if the set of data bits were part of a master data stream being delivered to each target master port 96. Accordingly, each target master port 96 is able to retrieve the set of data bits intended for that target master port 96 as if the respective split data stream delivered to that target master port 96 was the actual master data stream.

Once the split data streams are delivered to the appropriate master data port 96, the master data ports 96 deliver their received split data stream to the respective target device coupled thereto. Each master data port 96 has a plurality of SGPIO bus outputs (SIO_CLK output, SIO_LOAD output, and SIO_DATA_OUT output) to deliver the split data stream properly to the respective target device coupled thereto. As will be discussed in greater detail hereinbelow, each master data port 96 also has an SGPIO input (SIO_DATA_IN input) to receive a returning split data stream from the respective target device coupled thereto.

According to embodiments of the invention, the state machine 84 and/or other appropriate portions of the processor/controller 82 also are configured to assemble returning split data streams received by the target master ports 96 from their respective coupled target devices into a returning or outgoing master data stream for deliver back to the initiator device. According to embodiments of the invention, each target master port 96 receives a returning split data stream on the SIO_DATA_IN input. The returning split data streams are coupled to the processor/controller 82 via the at least one multiplexer (MUX) or other suitable coupling device 99 as part of a returning master data stream.

The state machine 84 and/or other appropriate portions of the processor/controller 82 are configured to assemble the returning split data streams appropriately into a single returning master data stream. That is, the data bits from the returning split data stream delivered to the first target master port 96 are assembled as the first set of data bits in the returning master data stream, the data bits from the returning split data stream delivered to the second target master port 96 are assembled as the second set of data bits in the returning master data stream, the data bits from the returning split data stream delivered to the third target master port 96 are assembled as the third set of data bits in the returning master data stream, and the data bits from the returning split data stream delivered to the nth target master port 96 are assembled as the nth set of data bits in the returning master data stream. The state machine then delivers the assembled returning master data stream to the initiator device via the SIO_DATA_OUT output.

Figure 7:
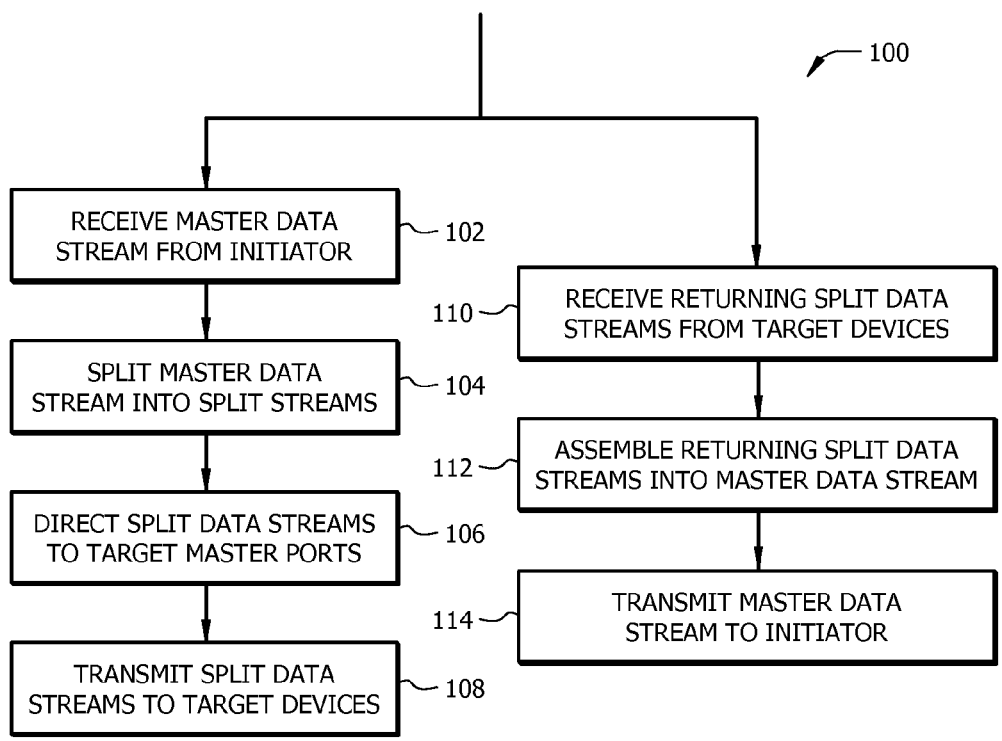
FIG. 7 is a block diagram of a method for transmitting SGPIO data between an initiator device and a plurality of target devices, according to embodiments of the invention.

Referring now to FIG. 7, shown is a block diagram of a method 100 for transmitting SGPIO data between an initiator device and a plurality of target devices, according to embodiments of the invention. The method 100 includes a step 102 of receiving a master data stream from an initiator device. As discussed hereinabove, the expander device 80 receives a master data stream from an initiator device via the SGPIO inputs coupled to the state machine 84 portion of the processor/controller 82. The master data stream includes a serial data output sequence of data bits for use by the plurality of target devices.

The method 100 also includes a step 104 of splitting the received master data stream into a plurality of split data streams. The state machine 84 and/or other appropriate portions of the processor/controller 82 split the received master data stream into a plurality of split data streams based on the sets of data bits in the master data stream. As discussed hereinabove, the state machine 84 and/or other appropriate portions of the processor/controller 82 split the master data stream into a first split data stream having a first set of data bits for delivery to the first target device (via the first target master port), a second split data stream having a second set of data bits for delivery to the second target device (via the second target master port), a third split data stream having a third set of data bits for delivery to the third target device (via the third target master port), and an nth split data stream having an nth set of data bits for delivery to the nth target device (via the nth target master port).

The method 100 also includes a step 106 of directing the plurality of split data streams to the appropriate target master ports 96 of the corresponding plurality of target master ports 96. More specifically, the state machine 84 and/or other appropriate portions of the processor/controller 82 direct the first split data stream (resulting from the splitting step 104) to the coupling device 96 coupled to the first target master port 96, the second split data stream to the coupling device 96 coupled to the second target master port 96, the third split data stream to the coupling device 96 coupled to the third target master port 96, and the nth split data stream to the coupling device 96 coupled to the nth target master port 96.

The method 100 also includes a step 108 of transmitting or delivering the plurality of split data streams to their respective target devices. Each of the plurality of master data ports 96 delivers the split data stream received thereby to the respective master data port 96 coupled thereto. For example, the first master data port 96 receives and delivers the first split data stream to the first target device, which is coupled to the first master data port 96, e.g., via an appropriate SGPIO bus coupled therebetween. Similarly, the second master data port 96 receives and delivers the second split data stream to the second target device, e.g., via an appropriate SGPIO bus coupled therebetween. Also, the third master data port 96 receives and delivers the third split data stream to the third target device, e.g., via an appropriate SGPIO bus coupled therebetween, and the nth master data port 96 receives and delivers the nth split data stream to the nth target device, e.g., via an appropriate SGPIO bus coupled therebetween.

The method 100 also includes a step 110 of receiving a plurality of returning split data streams from the plurality of target devices. Each master data port 96 has an SGPIO input (SIO_DATA_IN) to receive a split data stream from the respective target device coupled to the master data port 96, e.g., via an appropriate SGPIO bus.

The method 100 also includes a step 112 of assembling the returning split data streams into a returning or outgoing master data stream. The state machine 84 and/or other appropriate portions of the processor/controller 82 assemble at least a portion of the returning split data streams received by the target master ports 96 from their respective coupled targets into a return or outgoing master data stream for deliver back to the initiator device. The multiplexer (MUX) or other suitable coupling device 99 coupled between the target master ports 96 and the processor/controller 82 couples together the returning split data streams received by the target master ports 96 from the target devices to the processor/controller 82.

According to embodiments of the invention, the processor/controller 82 assembles the returning split data streams into a returning or outgoing master data stream based on the sets of data bits in the returning split data streams. As discussed hereinabove, the processor/controller 82 assembles the data bits from the first returning split data stream delivered to the first target master port 96 as the first set of data bits in the returning master data stream. In a similar manner, the processor/controller 82 assembles the data bits from the second returning split data stream delivered to the second target master port 96 as the second set of data bits in the returning master data stream. Also, the processor/controller 82 assembles the data bits from the third returning split data stream delivered to the third target master port 96 as the third set of data bits in the returning master data stream, and assembles the data bits from the nth returning split data stream delivered to the nth target master port 96 as the nth set of data bits in the returning master data stream.

The method 100 also includes a step 114 of transmitting or delivering the assembled returning master data stream to the initiator device. Once the processor/controller 82 has assembled the returning or outgoing master data stream from the returning split data streams, the state machine 84 and/or other appropriate portions of the processor/controller 82 transmits or delivers the returning or outgoing master data stream to the initiator device via the SIO_DATA_OUT output, e.g., over an SGPIO bus coupled between the expander device 80 and the initiator device.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter," "then," "next," and other similar words are not intended to limit the order of the steps. These words simply are used to guide the reader through the description of the exemplary method. Also, one of ordinary skill in programming will be able to write computer code or identify appropriate hardware and/or circuits to implement the disclosed invention without difficulty, based on the flow charts and associated description in this specification. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures, which may illustrate various process flows.

In one or more aspects, the functions described may be implemented in hardware, software, firmware, or any combination thereof. If implemented in software, the functions may be stored on or transmitted as one or more instructions or code on a non-transitory computer-readable medium. Non-transitory computer-readable media includes both computer storage media and communication media including any tangible medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other tangible medium that may be used to carry or store desired program code in the form of instructions or data structures and that may be accessed by a computer.

It will be apparent to those skilled in the art that many changes and substitutions can be made to the embodiments of the invention herein described without departing from the spirit and scope of the invention as defined by the appended claims and their full scope of equivalents.

The invention claimed is:

1. A serial input/output (SIO) expander device, comprising:
   a processor/controller configured to receive a master data stream from an initiator device and to transmit a returning master data stream to the initiator device; and
   a plurality of target master ports coupled to the processor/controller and configured to transmit a split data stream to a target device coupled thereto and to receive a returning split data stream from the target device coupled thereto, wherein the processor/controller is configured to split the master data stream into a plurality of split data streams based on the data in the master data stream and to direct the split data streams to the corresponding plurality of target master ports based on the data in the split data streams, wherein the processor/controller directs the split data streams to the corresponding plurality of target master ports in such a way that each split data stream maintains the same bit positions as in the master data stream, and wherein the processor/controller is configured to assemble a plurality of returning split data streams into the returning master data stream based on the data in the returning split data streams and to transmit the returning master data stream to the initiator device.

2. The expander device as recited in claim 1, wherein the processor/controller is configured to split the master data stream into a first split data stream having a first set of data bits, a second split data stream having a second set of data bits, a third split data stream having a third set of data bits and an nth split data stream having an nth set of data bits, and wherein the processor/controller is configured to transmit the first split data stream to a first target master port, the second split data stream to a second target master port, the third split data stream to a third target master port and the nth split data stream to an nth target master port.

3. The expander device as recited in claim 1, wherein the processor/controller is configured to receive a first returning split data stream from a first target master port, a second returning split data stream from a second target master port, a third returning split data stream from a third target master port and an nth returning split data stream from an nth target master port, and wherein the processor/controller is configured to assemble the returning master stream in such a way that at least a portion of the first returning split data stream is located in a first data bit location in the returning master stream, at least a portion of the second returning split data stream is located in a second data bit location in the returning master stream, at least a portion of the third returning split data stream is located in a third data bit location in the returning master stream and at least a portion of the nth returning split data stream is located in an nth data bit location in the returning master stream.

4. The expander device as recited in claim 1, wherein the processor/controller includes a state machine configured to perform at least one of splitting the master data stream into the plurality of split data streams, transmitting the split data streams to the plurality of target master ports based on the data in the split data stream, assembling the plurality of returning split data streams into the returning master data stream and transmitting the returning master data stream to the initiator device.

5. The expander device as recited in claim 1, wherein the processor/controller includes a load address register configured to provide data storage and movement instructions to the split data streams transmitted to the plurality of target master ports.

6. The expander device as recited in claim 1, wherein at least one of the target master devices has coupled thereto a coupling device for coupling the split data stream with load address information from a load address register and with target bridge information from a target bridge.

7. The expander device as recited in claim 1, wherein the expander device includes a target bridge configured to provide configuration changes to at least one of the split data streams transmitted to the plurality of target master ports.

8. The expander device as recited in claim 7, wherein the target bridge includes an I2C target state machine.

9. The expander device as recited in claim 1, wherein the master data stream is an SFF-8485 master data stream having a plurality of SFF-8485 data bit sets.

10. The expander device as recited in claim 1, wherein the initiator device is an SFF-8485 initiator device and the plurality of target devices are SFF-8485 target devices.

11. A method for transmitting serial input/output (SIO) data between an initiator device and a plurality of target devices, the method comprising:

receiving a master data stream from the initiator device;

splitting the master data stream into a plurality of split data streams based on the data in the master data stream;

directing the split data streams to a plurality of target master ports based on the data in the split data stream, wherein the split data streams are directed to the plurality of target master ports in such a way that each split data stream maintains the same bit positions as in the master data stream;

transmitting the split data streams from the plurality of target master ports to a corresponding plurality of target devices;

receiving a plurality of returning split data streams from the plurality of target devices;

assembling the plurality of returning split data streams into a returning master data stream based on the data in the returning split data streams; and transmitting the assembled returning master data stream to the initiator device.

12. The method as recited in claim 11, wherein splitting the master data stream into a plurality of split data streams includes splitting the master data stream into a first split data stream having a first set of data bits, a second split data stream having a second set of data bits, a third split data stream having a third set of data bits and an nth split data stream having an nth set of data bits, and wherein directing the split data streams to the plurality of target master ports includes directing the first split data stream to a first target master port, directing the second split data stream to a second target master port, directing the third split data stream to a third target master port and directing the nth split data stream to an nth target master port.

13. The method as recited in claim 11, wherein receiving the plurality of returning split data streams from the plurality of target devices includes receiving a first returning split data stream from a first target master port, receiving a second returning split data stream from a second target master port, receiving a third returning split data stream from a third target master port and receiving an nth returning split data stream from an nth target master port, and wherein assembling the plurality of returning split data streams into the returning master data stream includes assembling the returning master stream in such a way that at least a portion of the first returning split data stream is located in a first data bit location in the returning master stream, at least a portion of the second returning split data stream is located in a second data bit location in the returning master stream, at least a portion of the third returning split data stream is located in a third data bit location in the returning master stream and at least a portion of the nth returning split data stream is located in an nth data bit location in the returning master stream.

14. The method as recited in claim 11, further comprising providing data storage and movement instructions to the split data streams directed to the plurality of target master ports.

15. The method as recited in claim 11, wherein directing the split data streams to a plurality of target master ports based on the data in the split data stream includes coupling at least one split data stream with load address information and target bridge information.

16. The method as recited in claim 11, wherein directing the split data streams to a plurality of target master ports based on the data in the split data stream includes providing configuration changes to at least one of the split data streams directed to the plurality of target master ports.

17. The method as recited in claim 11, wherein the master data stream is an SFF-8485 master data stream having a plurality of SFF-8485 data bit sets, wherein the initiator device is an SFF-8485 initiator device and wherein the plurality of target devices are SFF-8485 target devices.

18. A non-transitory computer readable medium storing instructions that carry out a method for transmitting serial input/output (SIO) data between an initiator device and a plurality of target devices, the non-transitory computer readable medium comprising:
   instructions for receiving a master data stream from an initiator device;
   instructions for splitting the master data stream into a plurality of split data streams based on the data in the master data stream;
   instructions for directing the split data streams to a plurality of target master ports based on the data in the split data stream, wherein the split data streams are directed to the plurality of target master ports in such a way that each split data stream maintains the same bit positions as in the master data stream;
   instructions for transmitting the split data streams from the plurality of target master ports to a corresponding plurality of target devices;
   instructions for receiving a plurality of returning split data streams from the plurality of target devices;
   instructions for assembling the plurality of returning split data streams into a returning master data stream based on the data in the returning split data streams; and
   instructions for transmitting the returning master data stream to the initiator device.

19. The non-transitory computer readable medium as recited in claim 18, wherein the instructions for splitting the master data stream into a plurality of split data streams includes instructions for splitting the master data stream into a first split data stream having a first set of data bits, instructions for splitting the master data stream into a second split data stream having a second set of data bits, instructions for splitting the master data stream into a third split data stream having a third set of data bits and instructions for splitting the master data stream into an nth split data stream having an nth set of data bits, and wherein the instructions for directing the split data streams to the plurality of target master ports includes instructions for directing the first split data stream to a first target master port, instructions for directing the second split data stream to a second target master port, instructions for directing the third split data stream to a third target master port and instructions for directing the nth split data stream to an nth target master port.

20. The non-transitory computer readable medium as recited in claim 18, wherein the instructions for receiving the plurality of returning split data streams from the plurality of target devices includes instructions for receiving a first returning split data stream from a first target master port, instructions for receiving a second returning split data stream from a second target master port, instructions for receiving a third returning split data stream from a third target master port and instructions for receiving an nth returning split data stream from an nth target master port, and wherein the instructions for assembling the plurality of returning split data streams into the returning master data stream includes instructions for assembling the returning master stream in such a way that at least a portion of the first returning split data stream is located in a first data bit location in the returning master stream, at least a portion of the second returning split data stream is located in a second data bit location in the returning master stream, at least a portion of the third returning split data stream is located in a third data bit location in the returning master stream and at least a portion of the nth returning split data stream is located in an nth data bit location in the returning master stream.

* * * * *